(No Model.)
A. R. YOUNG.
ATTACHMENT FOR CORN PLANTERS.
No. 602,534. Patented Apr. 19, 1898.
Fig. 1.
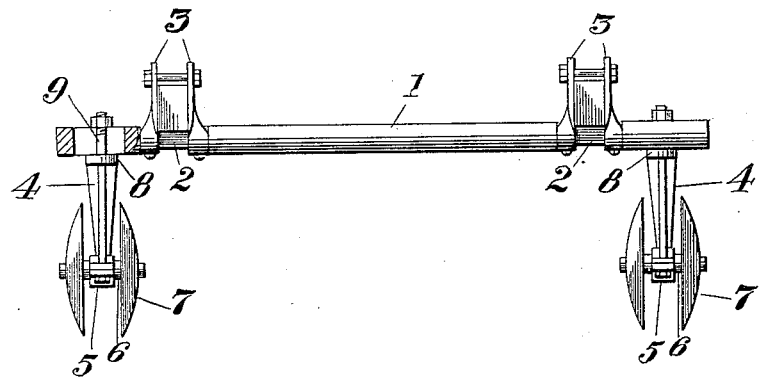
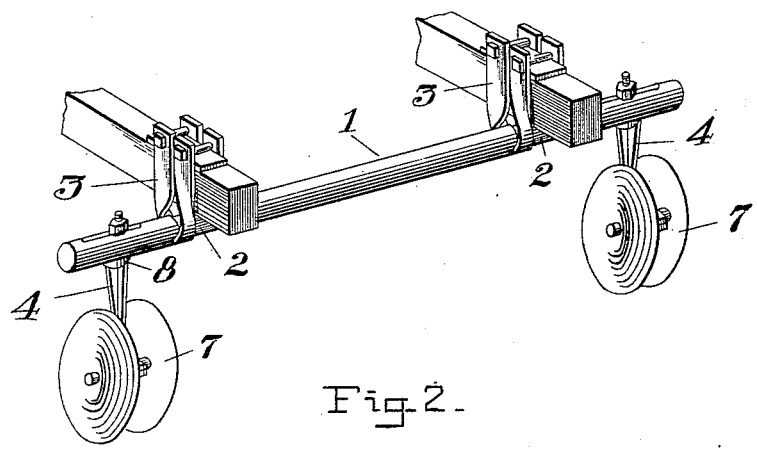
Fig. 2.
Witnesses
Chas. P. Heinemann.
Victor J. Evans.
Inventor
A. R. Young
By John Wedderburn, Attorney

UNITED STATES PATENT OFFICE.

ALBA R. YOUNG, OF MURRAY, NEBRASKA.

ATTACHMENT FOR CORN-PLANTERS.

SPECIFICATION forming part of Letters Patent No. 602,534, dated April 19, 1898.

Application filed June 10, 1897. Serial No. 640,219. (No model.)

*To all whom it may concern:*

Be it known that I, ALBA R. YOUNG, of Murray, in the county of Cass and State of Nebraska, have invented certain new and useful Improvements in Attachments for Corn-Planters; and I do hereby declare the following to be a full, clear, and exact description of the invention, such as will enable others skilled in the art to which it appertains to make and use the same.

The object of this invention is to provide an attachment for a corn-planter of ordinary construction to present dished wheels or disks that travel in the rear of the planting mechanism and form ridges of loose dirt over the seed and provide for running off the water to prevent the seed being washed away in a heavy rain.

The attachment also provides for covering the weeds in case they have started before the corn could be sowed.

With the above objects in view the invention consists in an attachment for corn-planters comprising a bar having upwardly-projecting arms or clips by which it is attached to a cross-piece of the planter and depending adjustable hangers with bearings at their lower ends, together with dished wheels or disks mounted upon axles supported in the bearings of the hangers, all as described in detail in the following specification and the novel features of construction hereinafter fully set forth.

In the accompanying drawings, forming part of this specification, Figure 1 is a rear elevation showing the application of my invention. Fig. 2 is a detail perspective view of the attachment.

Referring to the drawings by numerals, 1 designates a bar which is of a length equal to or greater than the width of the supporting-frame of a corn-planter in order to extend across the rear end of the same when applied thereto. This bar is provided at suitable points with squared portions 2, to which are attached metal loops 3, bent to embrace the squared portion of the bar, upon which it is held by machine-screws, the ends of the straps projecting upward, and having apertures or bolt-holes in their terminals. The bar is also provided adjoining each end with a depending hanger 4, which is adjustably secured thereto, as hereinafter described, the lower end of the hangers having bearing-boxes 5, consisting of a rigid section and removable section, the removable section being connected to the rigid section by bolts. These hangers form bearings or supports for axles 6, upon each end of which is mounted a dished wheel or disk 7.

The bars are slotted longitudinally, and a shank is formed on the hanger, presenting a shoulder 8, which bears against the under side of the bar, and a threaded end 9, that extends beyond the upper edge thereof to receive a nut which holds the hanger in an adjusted position. This provides for adjusting the two sets of dished wheels or disks to and from each other to accommodate the relative position of the seed-planting mechanism.

In attaching the device hereinbefore described to a corn-planter the upper ends of the arms or clips 3 are placed in engagement with a cross-piece of the planter to bear against the opposite side thereof and are held in positive engagement therewith by passing a bolt through the upper ends of the arms. The hangers can then be adjusted and bring them on a line in the rear of the planting mechanism, and the dished wheels or disks are turned at the proper angle with respect to the draft, so as to properly throw the dirt upon the row, the said disks entering the ground only to a slight extent.

It will therefore be seen that this device forms a very simple attachment for corn-planters and one that possesses the advantage of being effective in operation.

By using this attachment the effectiveness of the ordinary corn-planter is considerably added to, as the seed after being planted will be covered by a ridge of loose dirt, which, though it will take in rain, will also prevent the seed washing away under a heavy fall of rain.

Having thus described my invention, what I claim as new, and desire to secure by Letters Patent, is—

In an attachment for corn-planters, the combination of a bar having reduced portions which are squared, metal loops or clips engaging the squared portion to provide for connecting the bar to a corn-planter, said bar having slots near its ends, hangers formed with shanks presenting shoulders which bear against the under side of the bar when the shanks are passed through the slots in said bar, the upper ends of said shanks being threaded, and nuts for securing the hangers in an adjusted position upon the bar; together with dished wheels or disks connected to axles supported in bearings at the lower ends of the hangers, substantially as shown and for the purpose set forth.

In testimony whereof I have signed this specification in the presence of two subscribing witnesses.

ALBA R. YOUNG.

Witnesses:
FRANCIS M. YOUNG,
JNO. E. GILMORE.